(12) United States Patent
Jang et al.

(10) Patent No.: US 11,356,868 B2
(45) Date of Patent: Jun. 7, 2022

(54) DEVICE AND SYSTEM FOR MANAGING SERVICE DEVICE WITH COMMUNICATION MODULE

(71) Applicant: LG ELECTRONICS INC., Seoul (KR)

(72) Inventors: Bongmun Jang, Seoul (KR); Sangjin Park, Seoul (KR); Haesoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 16/490,055

(22) PCT Filed: Feb. 1, 2019

(86) PCT No.: PCT/KR2019/001412
§ 371 (c)(1),
(2) Date: Aug. 29, 2019

(87) PCT Pub. No.: WO2020/158978
PCT Pub. Date: Aug. 6, 2020

(65) Prior Publication Data
US 2021/0337403 A1 Oct. 28, 2021

(51) Int. Cl.
H04W 24/04 (2009.01)
H04L 12/28 (2006.01)
H04L 41/069 (2022.01)
H04L 43/0811 (2022.01)
H04W 40/24 (2009.01)

(52) U.S. Cl.
CPC ......... *H04W 24/04* (2013.01); *H04L 12/2825* (2013.01); *H04L 41/069* (2013.01); *H04L 43/0811* (2013.01); *H04W 40/248* (2013.01); *H04L 2012/2841* (2013.01)

(58) Field of Classification Search
None
See application file for complete search history.

(56) References Cited

U.S. PATENT DOCUMENTS

| 10,257,686 | B2* | 4/2019 | Logue ...................... G08B 3/10 |
| 2007/0104180 | A1 | 5/2007 | Aizu et al. |
| 2012/0026895 | A1 | 2/2012 | Wentink |
| 2012/0099585 | A1 | 4/2012 | Yamamoto et al. |
| 2013/0214935 | A1 | 8/2013 | Kim et al. |
| 2016/0378082 | A1 | 12/2016 | Fisher et al. |
| 2017/0094706 | A1* | 3/2017 | Kim ........................ H04W 12/08 |
| 2017/0359319 | A1* | 12/2017 | Kelsey .................. H04W 12/03 |

FOREIGN PATENT DOCUMENTS

| KR | 1020130021146 | 3/2013 |
| KR | 1020140098287 | 8/2014 |

* cited by examiner

Primary Examiner — Robert M Morlan
(74) Attorney, Agent, or Firm — Lee Hong Degerman Kang & Waimey

(57) ABSTRACT

A device and system for managing a service device provided with a communication module are disclosed, and the service device includes a communication unit directly communicating with either a hub device or an access point device and a device controller controlling the communication unit to perform connection to the hub device depending on communicative connectivity to the access point device.

13 Claims, 11 Drawing Sheets

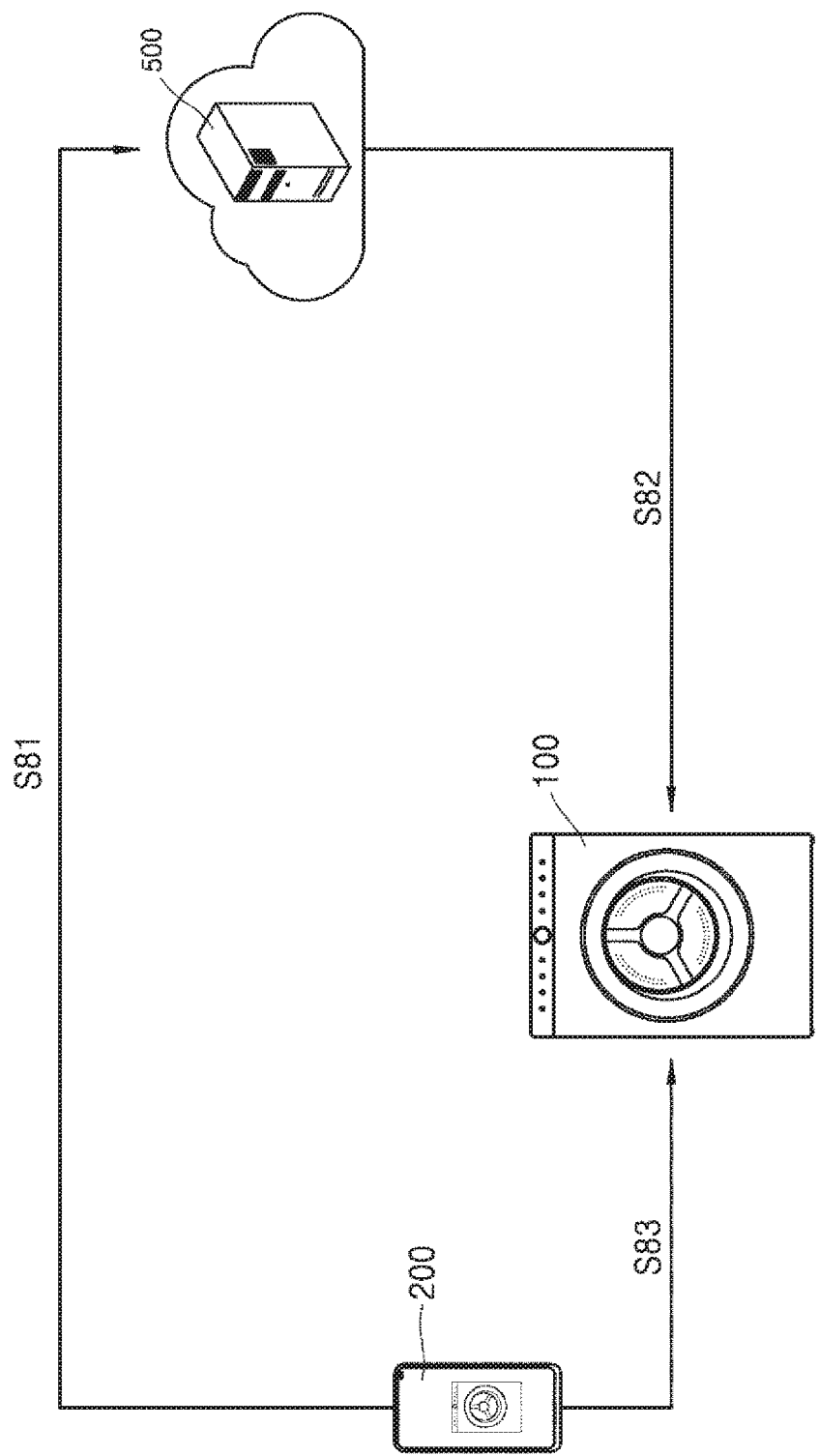

DEVICE AND SYSTEM FOR MANAGING SERVICE DEVICE WITH COMMUNICATION MODULE

CROSS-REFERENCE TO RELATED APPLICATIONS

This application is the National Stage filing under 35 U.S.C. 371 of International Application No. PCT/KR2019/001412, filed on Feb. 1, 2019, the contents of which are hereby incorporated by reference herein in its entirety.

TECHNICAL FIELD

The present invention relates to a device and system for managing service devices each provided with a communication module.

BACKGROUND ART

Recently, there are a number of stores that are provided with plural household appliances to provide services to users. Since such stores manage plural household appliances, integrated appliances management is required. In addition, there is a need for a technology for checking a failure or usage status of each appliance in an integrated management process.

Although production of household appliances having communication functions has increased, there is no integrated management device or method for actually managing such household appliances or checking conditions of the household appliances. As a result, a typical management device provides only a function of turning the appliances on/off.

Therefore, a method for integrated management of plural household appliances and a system implementing the same are disclosed herein.

DISCLOSURE

Technical Problem

A purpose of the present disclosure is to solve such a problem in the art and the present disclosure provides a method that can improve both ease of registration and management of in-store service devices by an operator and ease of acquisition of information on use of the in-store service devices by users.

Another purpose of the present disclosure is to provide a method that can provide remote monitoring and setup functions to remotely manage and control plural service devices.

Another purpose of the present disclosure is to provide a method that can facilitate communicative connection of in-store Wi-Fi-enabled service devices and can secure network stability by allowing the service devices to be connected to a hub device without any separate communication setup process.

The objects of this invention are not limited to the above-mentioned objects, and the other objects and advantages of this invention which are not mentioned can be understood by the following description and more clearly understood based on the embodiments of this invention. It will also be readily seen that the objects and the advantages of this application may be realized by the means defined in the claims.

Technical Solution

In one embodiment of the present invention, a service device provided with a communication module includes a communication unit directly communicating with either a hub device or an access point device; and a device controller controlling the communication unit to perform connection to the hub device depending upon communicative connectivity to the access point device.

In one embodiment of the present invention, the service device may communicate with the hub device upon receiving a reset command or at the start of initial operation.

In one embodiment of the present invention, an installation management device for managing a service device provided with a communication module sets communication setup information or device setup information on a service device communicatively connected to a hub device or an access point device.

In one embodiment of the present invention, the installation management device may monitor communicative connectivity between the service device and the access point device and sets communication setup information for connection to the hub device as the communication setup information on the service device.

In one embodiment of the present invention, a system for managing a service device provided with a communication module includes a server receiving control information from an operation management device to transmit the control information to the service device and receiving status information on the service device from the service device to transmit the status information to the operation management device.

In one embodiment of the present invention, the system may include the operation management device monitoring the service device to generate the control information.

In one embodiment of the present invention, the system may include a plurality of service devices receiving the control information from the server and transmitting the status information to the server.

Advantageous Effects

According to the embodiments of the present invention, an operator can allow service devices to access the Internet via a hub device without setting information necessary for communicative connection with an access point device in each of the service devices, whereby initial registration of the service devices can be more quickly achieved.

In addition, according to the embodiments of the present invention, the hub device can operate in a wireless mode to provide the same function as the access point device, thereby securing in-store communication stability.

Further, according to the embodiments of the present invention, it is possible to remotely control the service devices and to switch communicative connections of the service devices or reset functions of the service devices depending upon communication conditions of the service devices.

Furthermore, according to the embodiments of the present invention, a user can easily acquire information on use of the service devices.

It should be understood that the present invention is not limited to the effects described above and various other effects of the present invention can be easily conceived from the features of the present invention by those skilled in the art.

DESCRIPTION OF DRAWINGS

FIG. 11 shows a process in which a service device identifies a customer device making a reservation according to one embodiment of the present invention.

DETAILED DESCRIPTION

Figure 1:
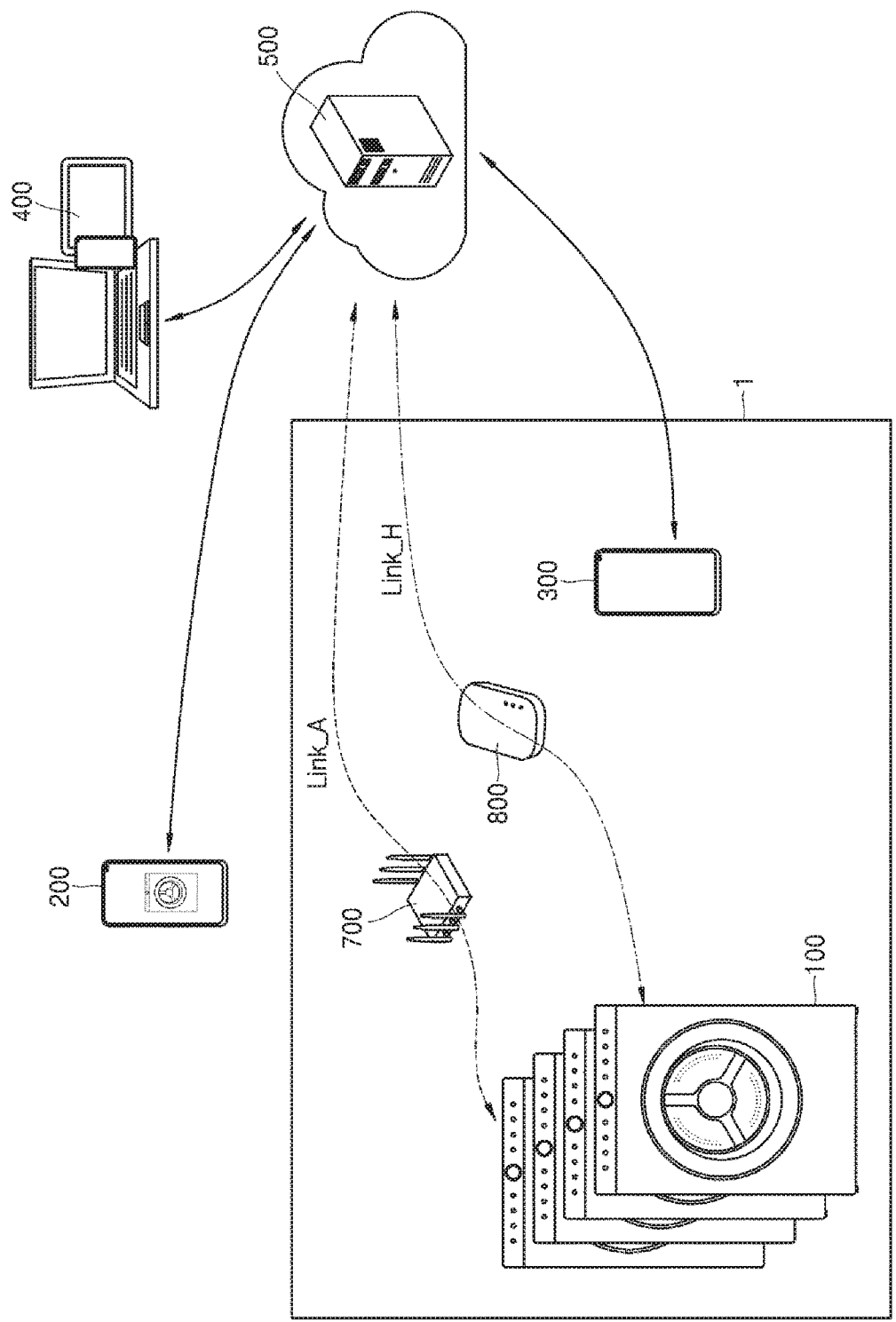
FIG. 1 shows a configuration of in-store devices according to one embodiment of the present invention.

Hereinafter, embodiments of the present invention will be described with reference to the accompanying drawings such that the present invention can be easily implemented by those skilled in the art. It should be understood that the present invention may be embodied in different ways and is not limited to the following embodiments.

In the drawings, portions irrelevant to the description will be omitted for clarity. Like components will be denoted by like reference numerals throughout the specification. Further, some embodiments of the present invention will be described in detail with reference to the exemplary drawings. Here, like reference numerals are used to denote like elements even when the elements are shown in different drawings. Description of known functions and constructions which may unnecessarily obscure the subject matter of the present invention will be omitted.

It will be understood that, although the terms "first", "second", "A", "B", "(a)", "(b)", etc. may be used herein to describe various elements, components, regions, layers and/or sections, the nature, order, sequence, or number of these elements, components, regions, layers and/or sections should not be limited by these terms. These terms are only used to distinguish one element, component, region, layer or section from another element, component, region, layer or section. In addition, when an element or layer is referred to as being "on," "connected to," or "coupled to" another element or layer, it may be directly on, connected to, or coupled to the other element or layer or intervening elements or layers may be present.

It will be understood that, although components may be individually described in each embodiment of the present invention for convenience of explanation, these components may be implemented as one device or module, or one component may be commonly implemented in plural devices or modules.

As used herein, the term "service device" refers to one of plural household appliances installed in a store and each provided with a communication module. Here, the expression "provided with a communication module" means that the service device has a communication function. Examples of such a service device include washing machines, drying machines, clothes cleaning machines, clothes washing machines, and the like. In addition, examples of the service device also include computers, laptops, and the like. Further, a plurality of the same or similar types of home appliances disposed in a single store to provide services to users also corresponds to the service device set forth herein.

FIG. 1 shows a configuration of in-store devices according to one embodiment of the present invention. Referring to FIG. 1, a system for managing a service device provided with a communication module includes a server 500, an operation management device 400, an installation management device 300, a customer device 200, a service device 100, an access point device 700, and a hub device 800, wherein the access point device 700 and the hub device 800 are involved in network connection. FIG. 1 is a schematic diagram of the system for managing the service device provided with the communication module.

Now, details of each component of the system will be described.

The service device 100 has a communication function, for example, a wireless LAN communication function such as Wi-Fi. However, it should be understood that the present invention is not limited thereto and the service device 100 may use various communication protocols and either the access point device 700 or the hub device 800 may be selectively disposed in a store depending upon the type of communication protocols.

A plurality of service devices 100, the access point device 700, and the hub device 800 are disposed in the store 1. The installation management device 300 is also disposed in the store to perform operations such as registration or deletion of the service devices 100 in or from the server 500.

The service devices 100 receive control information from the server 500. The control information is generated by the operation management device 400 and is transmitted to the server 500. Each of service devices 100 transmits status information to the server 500 during or after operation of the service device according to the control information.

The customer device 200 allows a customer inside or outside the store 1 to check a usage status of the service device 100 or to view promotion information on the store 1.

The operation management device 400 monitors the service device 100 remotely or inside the store and generates the control information for controlling operation of the service device 100. The generated control information is transmitted to the service device 100 via the server 500.

The operation management device 400 allows a store operator to access the server 500 to remotely monitor or control the service devices 100 inside the store. In addition, with the operation management device 400, the store operator can register an account for the store or information on the service devices 100.

The hub device 800 allows the service devices 100 to be conveniently registered in the server 500 using a communication protocol.

The installation management device 300 is a device used by a store operator and provides a function to register an operator account or the store. In addition, an application may be installed in the installation management device 300 to control and manage installation of the service devices 100 in the store via the access point device 700 or the hub device 800 in the store.

In one embodiment, the operation management device 400 may be a computer, a laptop, or the like and the installation management device 300 may be a smartphone, a tablet, or the like. In one embodiment, a single computer, laptop, smartphone, or tablet may provide both the function of the installation management device 300 and the function of the operation management device 400 at the same time. That is, a single device may provide the functions of the installation management device 300 and the operation management device 400.

The service device 100 may be connected to the access point device 700 or the hub device 800 in the store using the communication protocol. In addition, the service device 100 may communicate with the server 500 via the access point device 700 or the hub device 800 in the store and may perform product registration on the server 500. Here, the service device 100 may access the server 500 or perform product registration under control of the installation management device 300.

The customer device 200 is a device possessed by a user using the service device 100 in the store or a service provided by the store and includes an application installed thereon. The customer device 200 may acquire information on the store to register the store therein. The information on the store includes a QR code or PIN code disposed in the store, unique identification information on the store, or the like.

In addition, the customer device 200 displays current statuses of the service devices 100 in the store or a usage status of a specific service device 100 in use. Further, the customer device 200 may receive an alarm message when the service device 100 in use by a user completes a task. The server 500, the service device 100, and the customer device 200 may transmit information between one another.

The server 500 receives the control information from the operation management device 400 to transmit the control information to the service device 100 and receives the status information on the service device 100 from the service device 100 to transmit the status information to the operation management device 400.

More specifically, the server 500 stores information on the store and the service device 100 and updates the information. Plural devices 200, 300, 400 may access the server 500 to ascertain the information on the store or to check conditions of the service device 100, and the server 500 may provide a web page or the like to store information necessary for the plural devices 200, 300, 400 to monitor/control the service device.

In addition, the server 500 transmits the stored information to the plural devices 200, 300, 400. The installation management device 300 provides a function necessary for a store operator to register an account.

According to the embodiment shown in FIG. 1, a store operator can easily register and manage the service devices in the store and a user can easily acquire information on use of the service devices in the store.

In particular, the service devices each provided with a communication unit using a communication protocol such as Wi-Fi can be remotely controlled, for example, by transmitting information on operation status thereof or by being controlled by an external device. This provides convenience to both an operator and a user. The operator can use remote monitoring and setup functions using the operation management device 400 or installation management device 300 having a web page, an application, and the like installed thereon, thereby reducing operation/management costs while improving ease of management. Particularly, an operator operating plural stores can manage the stores remotely using the operation management device 400, thereby reducing the number of visits to the stores.

In addition, each service device may be connected to the hub device 800 without any separate communication setup process, whereby ease of connection of in-store Wi-Fi-enabled service devices can be improved and network stability can be secured. In particular, when a single access point device having a narrow network communication range is disposed in a large store, the hub device 800 can operate in a repeater mode to enhance communication stability.

Further, the application of the customer device 200 can register a preferred store, check or monitor service devices in the store, or set an alarm.

Since the service devices provide a communication function, such as Wi-Fi, a communication setup process can be simplified. In addition, the service devices can communicate with the operation management device 400, the installation management device 300, or the customer device 200 to transmit the information on current statuses of the service devices or to receive the control information.

Figure 3:
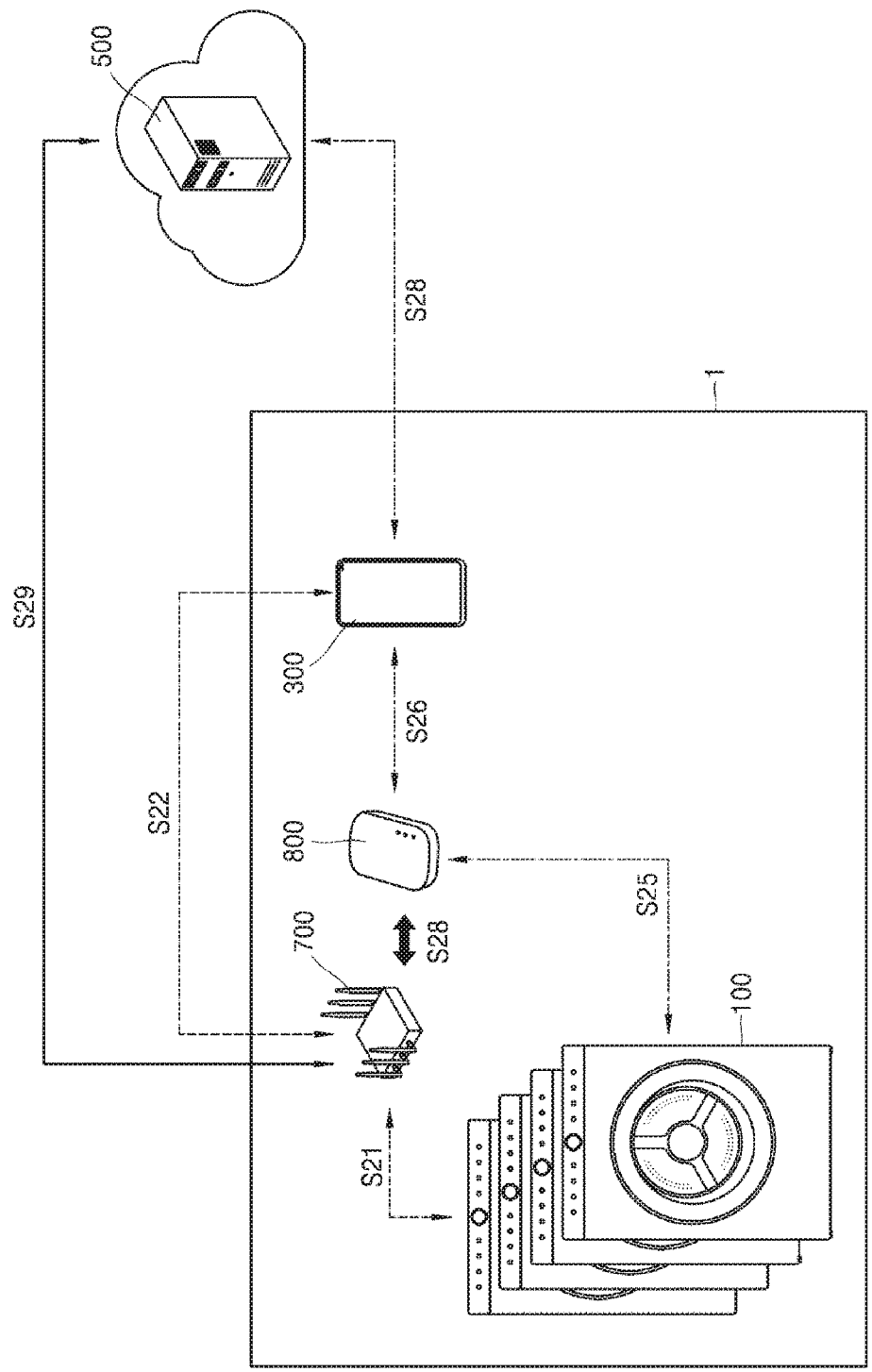
FIG. 3 illustrates a process of registering a service device according to one embodiment of the present invention.

In the configuration shown in FIG. 1, the server 500 may communicate with the operation management device 400, the installation management device 300, or the customer device 200. Alternatively, each of the service devices may communicate with the server 500 via the access point 700 (link_A) or via the hub device 800 (link_H), as shown in FIG. 3 described below.

Figure 2:
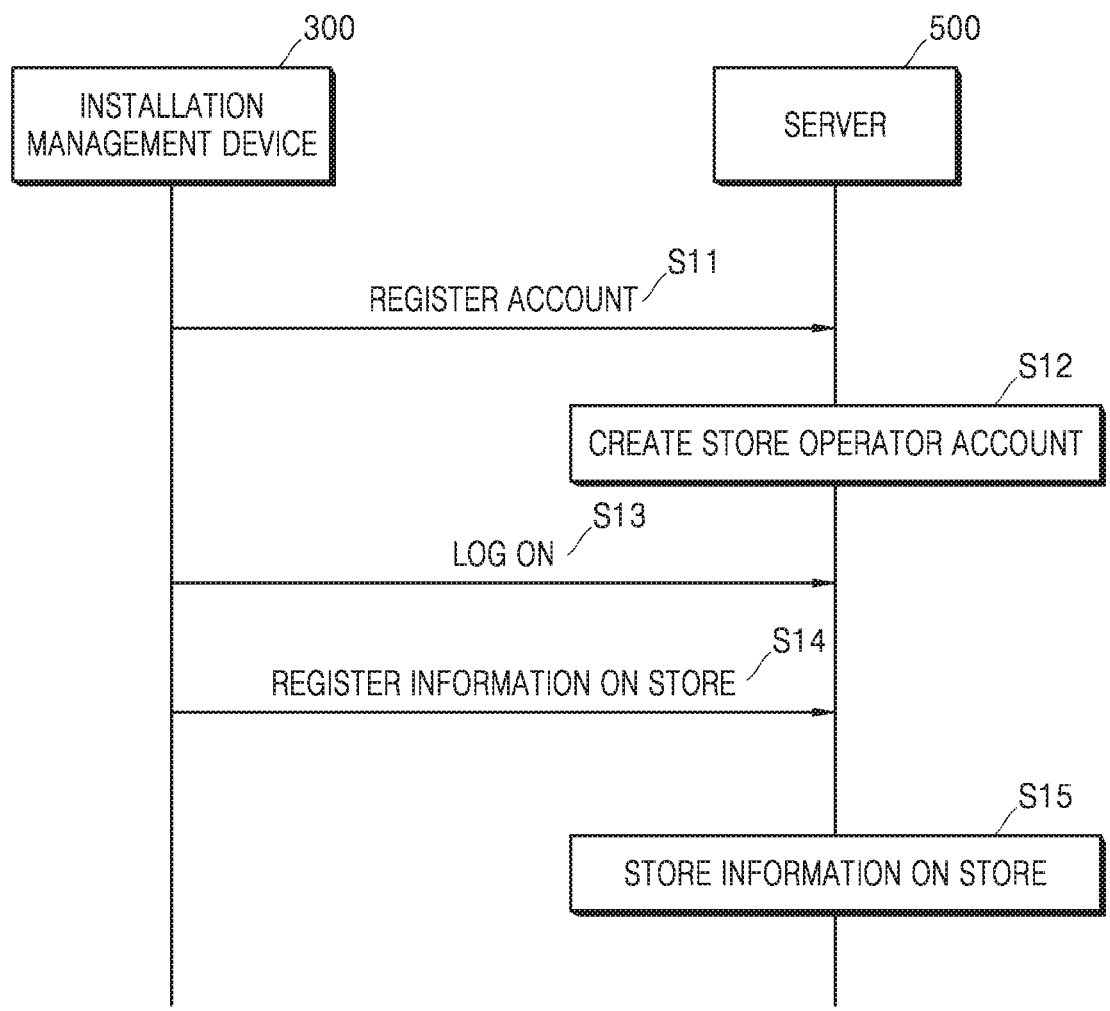
FIG. 2 illustrates a registration procedure between an installation management device and a server according to one embodiment of the present invention.

FIG. 2 illustrates a procedure of registration between an installation management device and a server according to one embodiment of the present invention.

In the embodiment shown in FIG. 2, the installation management device 300 and the server 500 communicate with each other using a general communication protocol (for example, wired LAN, wireless LAN, 5G, etc.).

The installation management device 300 performs account subscription using a protocol agreed with the server 500 (S11). Since account subscription is a function performed only by an authorized store operator, an operator may perform account subscription through input of a customer code for authentication or through a pre-arranged private URL connection. In this way, the server 500 prevents account subscription by any person other than an authorized operator. That is, the server 500 prevents unauthorized access to a corresponding web site.

When the installation management device 300 transmits information necessary for account subscription in step S11, the server 500 creates a store operator account (S12). Then, an operator may access the server 500 using the installation management device 300 or the operation management device 400. The operator logs on to the server 500 using the installation management device 300 or the operation management device 400 (S13) and registers information on the store (S14).

The installation management device 300 transmits information necessary for operation of the store, such as a store address, a contact number, price information, and an e-mail address, to the server 500 (S14), and the server 500 stores the received information on the store in a database (S15). When the installation management device 300, the operation management device 400, or the customer device 200 requests registered information, the server 500 may transmit the information to the corresponding device.

For example, the server 500 stores the account and information on the store registered by the installation management device 300 and provides a web page for operators or users. The installation management device 300, the operation management device 400, or the customer device 200 receives necessary store information from the server 500 using a software program or an application.

FIG. 3 illustrates a process of registering a service device according to one embodiment of the present invention. As in the embodiment shown in FIG. 3, the installation management device 300 and the server 500 communicate with each other using a general communication protocol (for example, wired LAN, wireless LAN, 5G, etc.), as described above.

Referring to FIG. 3, each of the service devices 100 may be registered in the server 500 via the installation management device 300. In the embodiment shown in FIG. 3, the service devices 100 may communicate through a Wi-Fi network. The service devices 100 may be connected to the installation management device 300 via the access point device 700. Alternatively, the service devices 100 may be connected to the installation management device 300 via the hub device 800.

More specifically, each of the service devices 100 may be connected to the access point device 700. For this purpose, the service devices 100 may store setup information necessary for connection to the access point device 700.

The service devices 100 are connected to the access point device 700 (S21). When the service devices 100 transmit information to the installation management device 300 via the access point device 700 (S22), the installation management device 300 may individually register each of the service device 100 in the server 500 (S28).

When service devices 100 unable to be connected to the access point device 700 among the service devices in the store are registered or all of the service devices in the store are collectively registered, the corresponding service devices 100 are connected to the hub device 800 (S25). The service devices 100 search for the hub device 800 in the store 1 to be connected to the hub device 800.

That is, the service devices 100 may communicate by being connected to the hub device 800 upon receiving a reset command or at the start of initial operation.

For example, when the service device receives the reset command, starts initial operation, or is unable to be communicatively connected to the access point device 700, the communication unit of the service device 100 may preferentially search for the hub device 800 such that the service device 100 is automatically connected to the hub device 800.

In this case, the service device 100 may access the Internet via the hub device 800 even when an operator does not set information necessary for communicative connection to the access point device 700 in each of the service devices 100. In this way, registration speed at the time of initial registration can be increased.

When the service devices 100 transmit information to the installation management device 300 via the hub device 800 (S26), the installation management device 300 may collectively register the service devices 100 in the server 500 (S28).

In addition, the installation management device 300 may transmit communication setup information to the service devices 100 connected to the hub device 800 such that the corresponding service devices 100 can switch connections from the hub device 800 to the access point device 700.

Alternatively, the hub device 800 may operate wirelessly to provide the same function as the access point device 700. That is, the hub device 800 may operate to allow the service devices in the store to be connected thereto and may operate wirelessly in a repeater mode. In this case, the service devices may access the server 500 via the hub device 800.

In particular, when the store is large or has a certain area where signals from the access point device 700 cannot be detected, the service device 100 is not likely to access the server 500. In this case, the hub device 800 may operate in the repeater mode such that the service devices 100 can access the server 500 or the installation management device 300 via the hub device 800, thereby overcoming environmental network constraints.

In this process, the installation management device 300 may set identification information (e.g., a nickname) for identification of each service device 100 as device setup information and may change the nickname, as needed. Further, the installation management device 300 may transmit the set nickname to the server 500 such that the operation management device 400 or the customer device 200 can ascertain the nickname.

In addition, upon modifying device setup information or communication setup information set in a specific service device 100, the installation management device 300 may control the specific service device 100 to be distinguished from the other services devices 100. For example, the installation management device 300 may control a display module of the specific service device 100 to output a blinking light signal or a sound signal such that an operator can distinguish the specific service device 100 from the other devices.

Further, the installation management device 300 may control a display module of any one selected from among the service devices 100 to output a blinking light signal or a sound signal. That is, when an application of the installation management device 300 selects an icon or nickname of a specific service device 100 in the process of matching the service devices 100 in the store with information on the service devices 100 registered in the server, an actual service device 100 in the store, corresponding to the selection, may output a sound signal or a blinking light signal such as LED light.

In addition to registration of the service devices 100, the installation management device 300 may modify or delete information on the registered service devices 100 and may cancel the registration itself.

The service devices 100 registered in the server 500 through the process shown in FIG. 3 transmit various types of status information generated during operation of the service devices or error information due to abnormal operation to the server 500. The server 500 stores the received information on the service devices 100 and transmits the stored information to the installation management device 300 or the operation management device 400.

As a result, the installation management device 300 or the operation management device 400 can check the operation statuses or abnormality of the service devices 100. In addition, the customer device 200 can remotely check the number of available service devices 100 or the current status of the service device 100 in use through access to the server 500.

When the service device 100 is registered in the server 500 through the process shown in FIG. 3, the service device may transmit information to the server 500 via the access point device 700 or the hub device 800 even in the absence of the installation management device 300, as shown in FIG. 1. The service device 100 may transmit various types of status information and error information to the server 500 via the access point 700 (S21 to S29).

When the hub device 800 is in the repeater mode, the service device 100 is connected to the hub device 800 (S25). The hub device 800 communicates with the access point device 700 by wire (S28). As a result, the service device 100 can communicate with the server 500 via the hub device 800 and the access point device 700 (S29).

As in the above embodiment, the server 500 stores an account registered by a store operator, store information, and information on the registered service devices 100 in the database.

In addition, the server 500 stores information on operation of the service devices 100 and revenue information transmitted from each store and performs data analysis on each store based on the information. In one embodiment, the server 500 may provide a new service through big data analysis based on the revenue information. The server 500 may transmit analysis results to the operation management device 400 and the operation management device 400 may conduct a promotion based on profitability calculated based on big data.

In particular, since big data analysis is based on sales information on other stores as well as sales information on a corresponding store, an operator of the corresponding store can ascertain a special sales situation of their store to determine whether to add another service device 100 or whether to expand promotion, based on the special sales situation.

The server 500 converts unstructured revenue data generated on a day/week/month/year basis into structured data. Then, the server 500 may provide analysis results based on the structured data to the operation management device 400.

In the embodiment shown in FIG. 3, the installation management device 300 communicating with the hub device 800 transmits setup information on each service device (e.g., device setup information or communication setup information) to the server. Afterwards, the installation management device 300 or the operation management device 400 may modify the setup information through access to the server 500.

Figure 4:
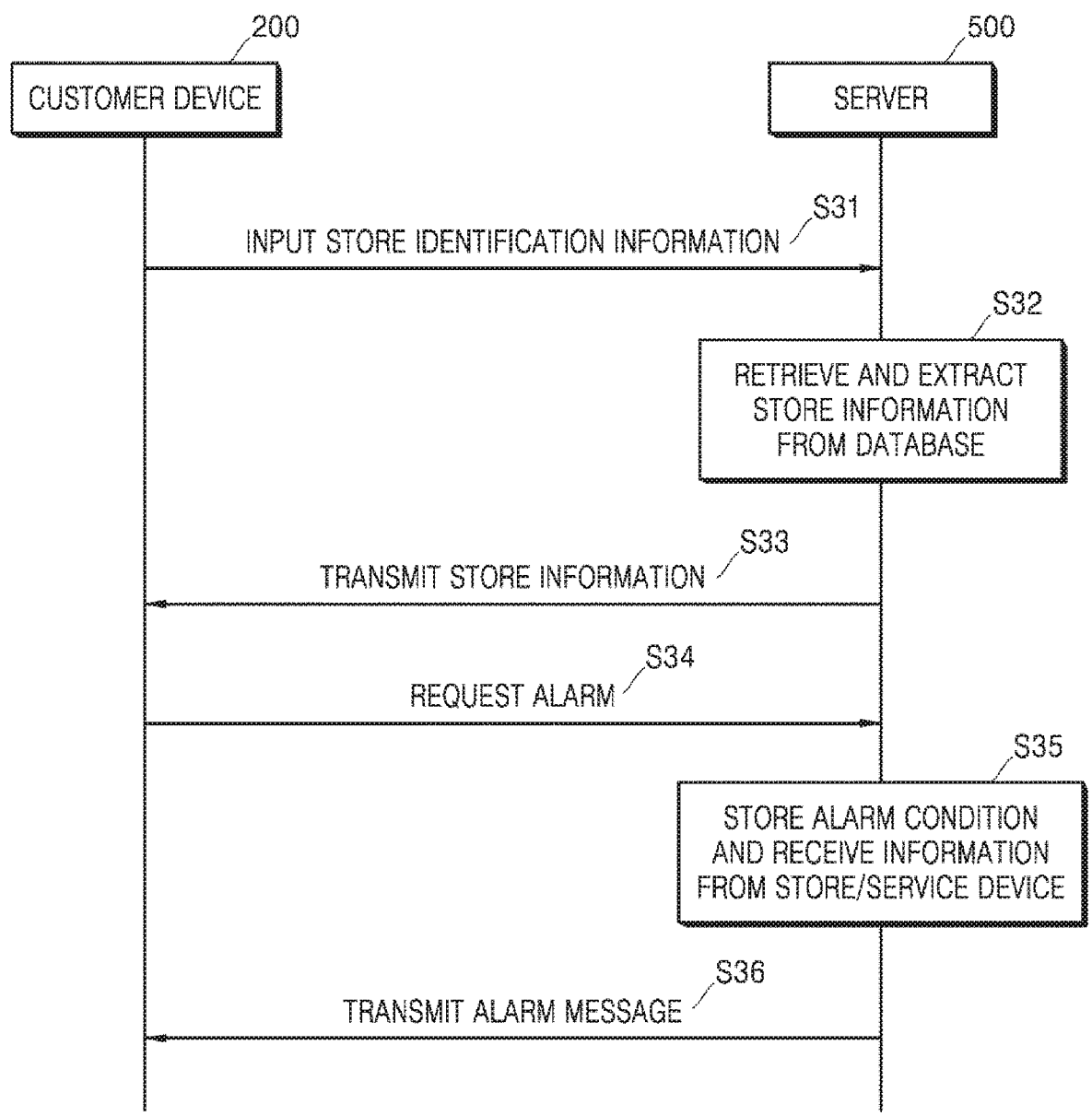
FIG. 4 illustrates a process of transmitting information between a customer device and a server according to one embodiment of the present invention.

FIG. 4 illustrates a process of transmitting and receiving information between a customer device and a server according to one embodiment of the present invention. In the embodiment shown in FIG. 4, a user can leave a store during use of a service device to attend to other duties. Referring to FIG. 4, the server 500 receives store identification information and a request for an alarm from the customer device 200. Then, the server 500 stores a condition of the alarm and receives information from the service device 100 in a store corresponding to the store identification information. When the information satisfies the alarm condition, the server 500 transmits an alarm message to the customer device 200.

Here, the alarm message may be information on an operation status of the service device. Alternatively, the alarm message may include information on a promotion regarding use of service devices in the store. For example, when the customer device 200 is set to receive an alarm indicating that a store operator runs a discount promotion for all or specific service devices, the alarm message is transmitted to the customer device 200.

For an alarm for reservation of use of the service device, the server 500 receives information on the location of the customer device 200 from the customer device 200. When the customer device 200 is located at a predetermined distance or more from the store, the server may delete a condition of the alarm. In this way, when the customer device 200 set to receive the alarm message has been moved far enough that a user cannot use the service device, unnecessary alarm generation can be avoided.

The customer device 200 may store and execute an application that can exchange information with the server 500. A user who intends to visit a store or to obtain information on the store inputs store identification information in the customer device 200 (S31). The store identification information includes a QR code, bar code, URL code, or PIN code attached to the store and a proper name of the store. Alternatively, the user may make a selection from a store list output by a web site provided by the server 500 or by the application of the customer device 200.

Upon receiving the store identification information from the customer device 200, the server 500 retrieves and extracts store information from the database (S32). The server 500 transmits the store information to the customer device 200 (S33). Examples of the transmitted information include the total number of service devices in the store, the number of available service devices, and information on operation hours of service devices. In addition, the customer device 200 may output the store information which is set or stored/modified by a store operator using the installation management device 300 or the operation management device 400.

The customer device 200 selects information to which a user needs to be alerted among the output information and requests that the server 500 provides an alarm for the information (S34). For example, the customer device 200 may request that the server 500 provides an alarm informing the user of various types of information necessary for use of services provided by the store, such as when a specific service device is available, when the store is available, or which service device has the shortest waiting time.

Further, the customer device may request an alarm for information on promotion activities based on profitable services provided by the store. For example, the store may offer discounts to customers visiting the store during off-peak hours. Such an offer may be transmitted to the customer device 200 registering the store therein via the server 500 such that a user can confirm that they qualify for the discounts when visiting the store at specific times, whereby the number of user visits to the store can be increased.

The server 500 stores a condition of the requested alarm. Then, the server receives information from the corresponding store and the service device in the store (S35). The server 500 transmits an alarm message to the customer device 200 when the store or the service device meets the alarm condition (S36).

The customer device 200 may select and register a store that a user intends to use, and may set an alarm through monitoring of service devices in the store. The customer device 200 may set an alarm to receive a push alarm. In one embodiment, the customer device 200 receives an alarm when the number of available service devices reaches a certain level, or before a selected service device completes a task.

In the configuration shown in FIG. 4, a user can search for a store that the user intends to use or can ascertain whether a specific service (for example, washing/drying) is completed through an alarm from the customer device 200. In addition, the user can select one service device among plural service devices using the customer device 200 and can receive an alarm related to the selected service device through the customer device 200.

When a service device having a specialized function is disposed in the store, a user may reserve the service device using the customer device 200. In this way, the user can reserve a selected service device without visiting the store in advance. In addition, the user can identify the reserved service device using the customer device 200 upon visiting the store. For example, the service device may optionally include an interface unit 140 for input of the QR code or the PIN code.

Figure 5:
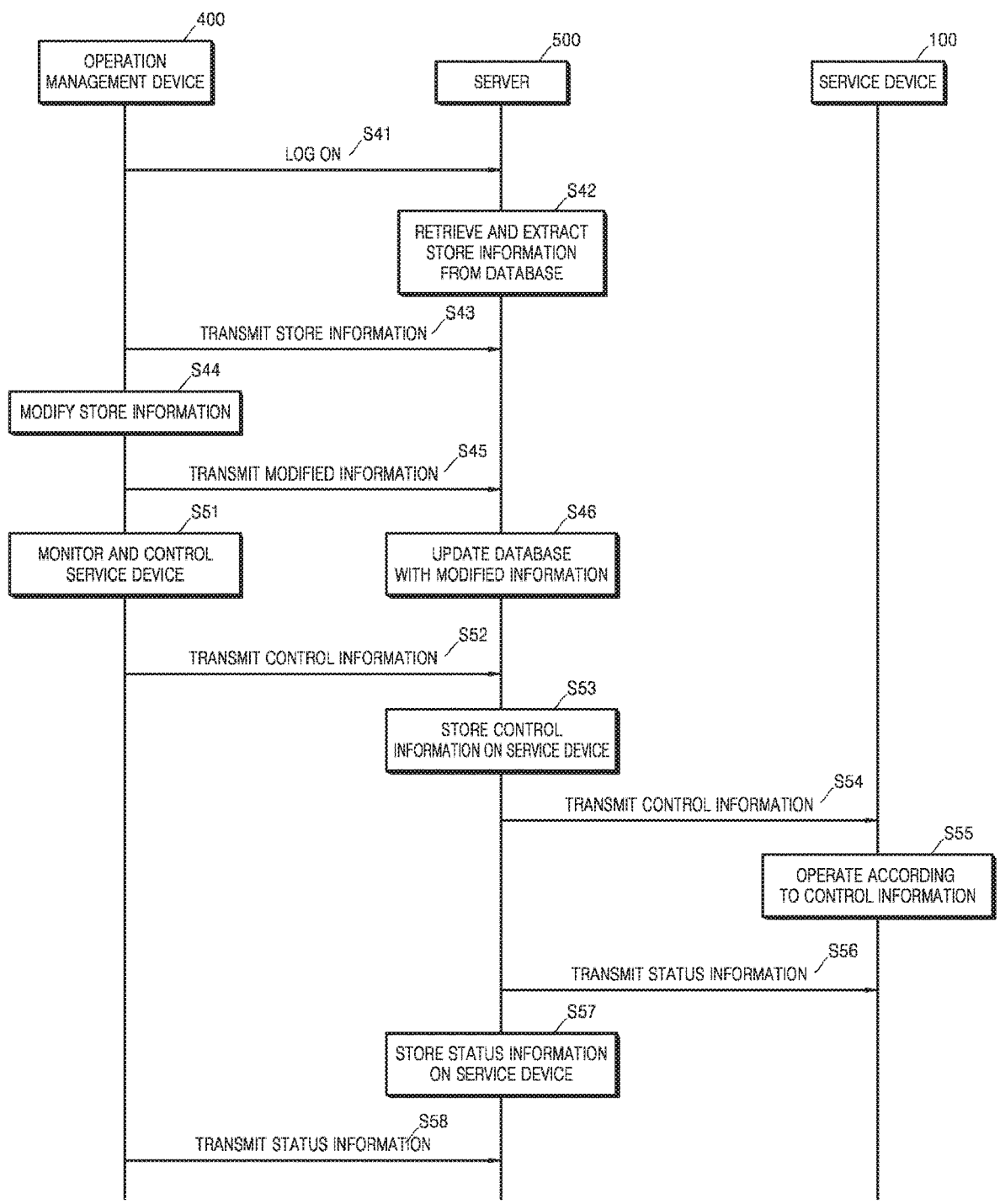
FIG. 5 illustrates a process of transmitting information between an operation management device and a server according to one embodiment of the present invention.

FIG. 5 illustrates a process of transmitting and receiving information between an operation management device and a server according to one embodiment of the present invention.

The operation management device 400 provides a function for an operator to monitor or control the service devices 100 remotely or in the store. In addition, the operation management device 400 may modify, delete, or supplement store information stored in the server 500.

The operation management device 400 logs on to the server 500 using an application. Upon logging-in through an account that is the same as the account created beforehand by the installation management device 300, the server 500 retrieves and extracts store information corresponding to the logged-in account from the database (S42).

The server 500 transmits the extracted store information to the operation management device 400 (S43). In step S43, the server 500 transmits information such as information on usage statuses of the service devices in the store, information on errors generated during operation of the service devices, or information on sales generated from services provided by the service devices. In particular, an operator can determine whether to perform maintenance or functional checks of plural service devices by checking the usage statuses (e.g., the number of uses) of the service devices.

By way of example, it is assumed that users prefer a service device at a specific location in the store. For example, when a first washing machine, which is close to a door or to a resting table, is mainly used, the first washing machine is more likely to fail than the other washing machines. Accordingly, an operator may set the first washing machine to be out of service for a certain period of time using the operation management device 400 in order to reduce a load of the first washing machine.

The server 500 may transmit data on current revenue status of the store to the operation management device 400. Here, the data on current revenue status of the store includes data on a period of time for which a main service of the store is used, a period of time for which users spend in waiting, and the number of times for which or a time zone at which users leave the store without using services. As a result, the operator may plan a promotion for increasing revenue based on the data on current revenue status of the store output by the operation management device 400 and input information on the promotion. The server may transmit the input information to the customer device 200.

The operation management device 400 outputs the received information and modifies the store information according to operation of an operator (S44). The modified information is transmitted to the server 500 (S45), and the server 500 updates the database with the modified information (S46). Here, updating the database includes adding or deleting a service device, changing business hours of the store, and the like. When the modified information is stored in the server 500, the installation management device 300 and the customer device 200 can ascertain the modified information.

In addition, the operation management device 400 may monitor the service devices or control a specific service device after outputting the information received in step S43 (S51). The operation management device 400 transmits control information on the service device to the server 500 (S52), which, in turn, stores the control information (S53). Then, the server 500 transmits the control information to the corresponding service device 100 (S54), such that the service device 100 operates according to the control information (S55).

The operation management device 400 may modify a displayed layout of plural service devices to comply with actual locations of the service devices in the store and may store the modified layout as store information. As a result, both an operator and a user can intuitively identify the service devices.

Steps S51 to S55 allow the operation management device 400 to monitor and control failure of the service device 100. As a result, an operator can cope with failure of the service device 100 even at a distance from the store.

In addition, the service device 100 transmits status information to the server 500 (S56) such that an operation history can be stored in the server 500. The server 500 stores the received status information (S57) such that the operation management device 400 can monitor the status information. The server 500 cumulatively stores status information about the operation and completion of operation of the service device 100 and error occurrence in the service device 100 over time (S57).

The server 500 transmits the stored status information to the operation management device 400 in real time or in response to a request of the operation management device 400 (S58). Then, the operation management device 400 may generate new control information based on the status information and transmit the new control information to the server 500.

According to the configuration shown in FIG. 5, the operation management device 400 may output current statuses of the service devices 100 in the store. For example, the operation management device 400 may output the total number of service devices 100 in the store, a usage rate of the service devices 100 in the store, and the number of service devices in which an error occurs. Here, the usage rate may be calculated by dividing the number of service devices in use by the total number of service devices in the store.

In addition, the operation management device 400 may modify settings of specific service devices 100 and may remotely control on/off of the service devices 100.

According to the above embodiments, in a business to business (B2B) cooperation between a store offering plural home appliances as service devices and a company selling or leasing the service devices, the store may be provided with an integrated solution for business operations, such as managing and monitoring the service devices, checking sales, and the like. In particular, a store operator can remotely monitor and control the store using the operation management device 400 and the installation management device 300.

In addition, with the installation management device 300, plural service devices can be quickly and conveniently registered in the server. This can be achieved by connection between the service devices 100 and the server 500 via the hub device 800. Via the hub device 800, the service devices 100 can communicate with the server 500 using a communication protocol such as Wi-Fi without setting up a separate network with the access point device 700.

Further, the server 500 may provide an operator's web page such that the installation management device 300 or the operation management device 400 can access information registered in the server, such as an operator account, store information, and information on Wi-Fi-enabled service devices, to ascertain information on operation of the store.

Moreover, the server 500 may communicate with the customer device 200 having a user application installed thereon to improve usage efficiency of the service devices in the store. In this way, a user can monitor operation statuses of Wi-Fi-enabled service devices without visiting a store in use thereby by registering the store in the customer device. In addition, a user may receive an alarm indicating that a service device in use has completed a task.

Particularly, for a service device providing a service taking a considerable amount of time, such as a washing machine and a drying machine, a user can ascertain the optimal time to visit the store using the customer device 200. In addition, after starting the service device, a user can attend other duties until the service device completes a task.

Since the hub device 800 functions as a dedicated gateway that service devices access, an operator does not need to individually set in-store Wi-Fi setup information in each service device.

That is, if connection between the hub device 800 and the access point device 700 is set, the other service devices can access the server 500 via the hub device 800. Further, in this way, the hub device 800 may continuously monitor connection conditions of the service devices 100 to primarily detect communication errors.

The configuration shown in FIG. 5 is summarized as follows: Steps S41 to S58 may be repeatedly conducted. The operation management device 400 receives a first type of status information transmitted from the service devices from the server 500 (S58). Then, the operation management device 400 outputs the received information and generates control information for controlling functions of the service devices 100, such as the operation or communicative connection of the service device 100, to transmit the generated control information to the server 500 (S52).

Then, the server 500 stores the control information in the database of the server 500 (S53) and transmits the control information to the service device 100 (S54). After operating to provide a specific function, the service device 100 generates a second type of status information resulting from provision of the function. The server 500 receives the second type of status information from the service device 100.

The server 500 stores the second type of status information in the database (S57) and then transmits the second type of status information to the operation management device 400 (S58). As a result, the operation management device 400 can ascertain results of controlling the service device 100.

In addition, in the embodiment shown in FIG. 5, when the operation management device 400 ascertains failure of a specific service device, the operation management device 400 may transmit a troubleshooting request for product maintenance to the server 500. The server 500 may provide a separate troubleshooting server with store identification information and identification information on the failed service device, whereby an operator can deal with the failed service device without going to the store.

Figure 6:
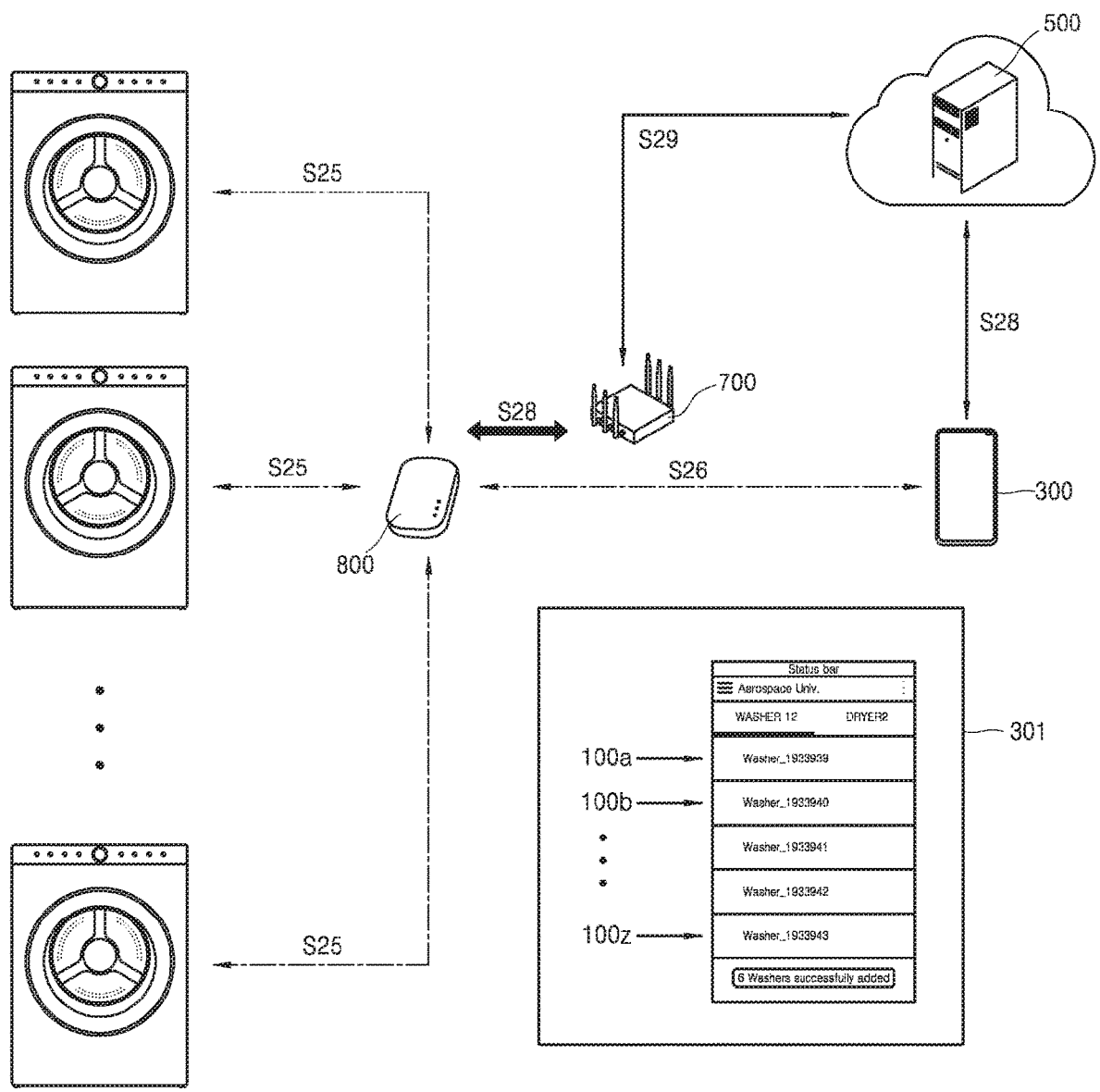
FIG. 6 illustrates a process of identifying a service device using a hub device according to one embodiment of the present invention.

FIG. 6 illustrates a process of identifying a service device using a hub device according to one embodiment of the present invention.

When plural service devices 100a, 100b, ..., 100z, for example, washing machines, are installed in a store, the service devices are automatically connected to the hub device 800 in the store (via link S25). Information necessary for access to the hub device 800 is previously stored in the service devices. Then, the hub device 800 transmits information on the service devices connected thereto to the installation management device 300 (via link S26).

The installation management device 300 may automatically search for the service devices connected to the hub device 800. A screen of the installation management device 300 outputs identification information on the service devices in the store, as shown in box 301 of FIG. 6. An operator registers the service devices in the server 500 (S28).

In this process, the installation management device 300 may identify each of the service devices 100a, 100b, ..., 100z to match the identification information on the service devices with actual service devices. For example, upon selecting Washing machine_1933939 indicated by 100a, an actual service device corresponding to 100a may output an alert sound or display a blinking light signal on a display window thereof. In this process, the operator may assign a nickname to each service device to improve readability.

When the service devices are registered in the server 500, operation statuses of the service devices are transmitted to the server 500 (link S29) via the hub device 800 and the access point device 700 (link S28).

Alternatively, the installation management device 300 may transmit setup information necessary for connection to the access point device 700 to each of the service devices in the process of registering the service devices. In this case, the service devices may be directly connected to the access point device 700 to transmit or receive information to or from the server 500 (link S21 of FIG. 3), depending upon communication conditions.

Alternatively, the service devices may be connected to the access point device 700 via the hub device 800 to transmit or receive information to or from the server 500. In this way, stability in connection to the Internet can be secured.

Accordingly, an operator does not need to input setup information on the access point device in each of the service devices, thereby facilitating operation of the service devices in the Internet environment.

Figure 7:
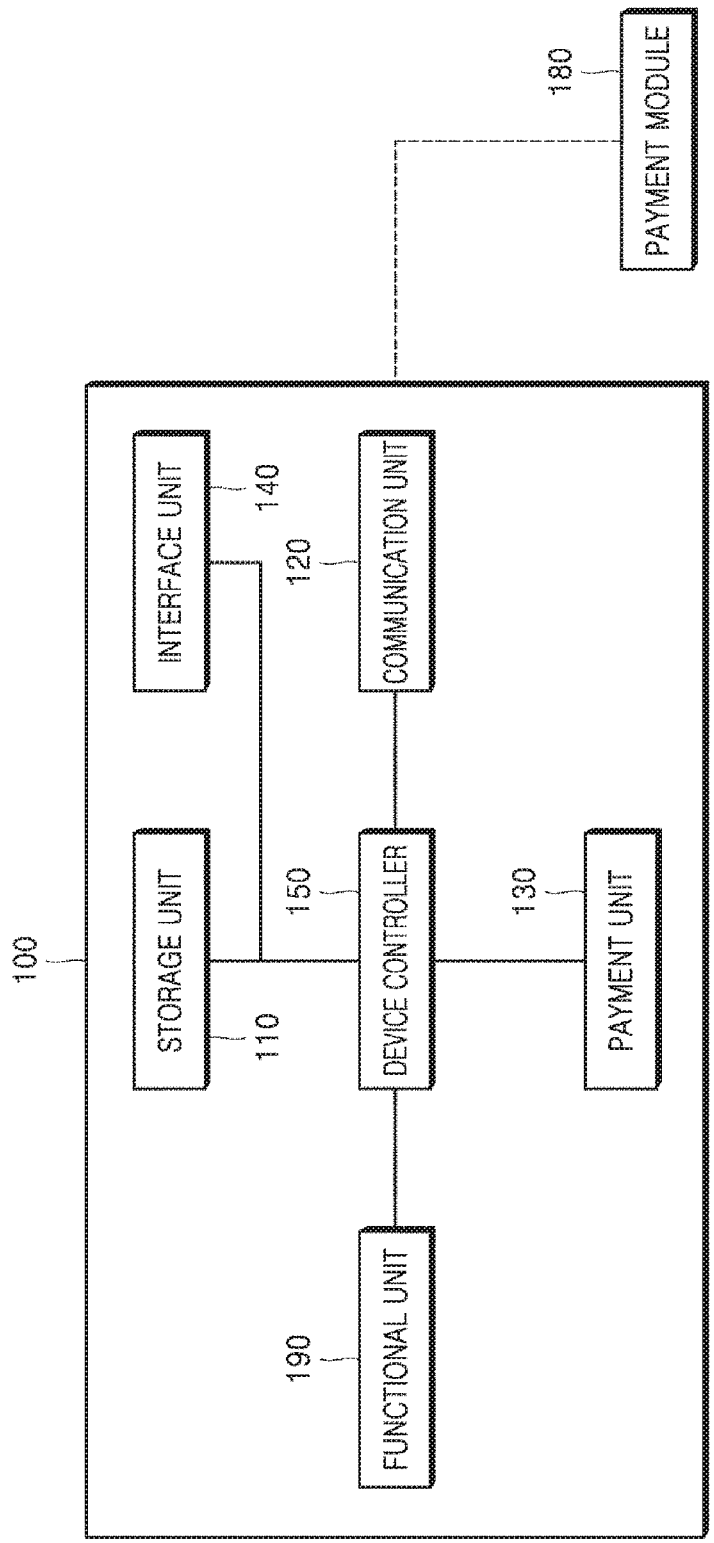
FIG. 7 shows a configuration of a service device according to one embodiment of the present invention.

FIG. 7 shows a configuration of a service device according to one embodiment of the present invention. Components of the service device 100 are as follows: A storage unit 110 stores device setup information and communication setup information. A functional unit 190 provides a specific function. In an embodiment where the service device 100 is a washing machine, the functional unit 190 includes a washing drum, a spin-dry drum, or the like.

In an embodiment where the service device 100 is a drying machine, the functional unit 190 includes a spin-dry drum. A communication unit 120 directly communicates with either the hub device 800 or the access point device 700. An interface unit 140 receives customer device identification information. Alternatively, the interface unit 140 may also receive store identification information. Here, the identification information may be implemented in various forms such as a QR code and a PIN code.

A device controller 150 may control the communication unit 120 to perform connection to the hub device 800 in the absence of stored communication setup information on the access point device 700 or depending upon communicative connectivity to the access point device 700. It will be understood that the device controller 150 may also control the functional unit 190 of the service device. In addition, the device controller 150 may update the information stored in the storage unit 110 according to communication setup information and device setup information received or transmitted from the server 500, the installation management device 300, or the operation management device 400.

In addition, the service device 100 includes a payment unit 130. The payment unit 130 may be integrated with the service device 100. Alternatively, a payment module 180 providing a payment function to plural service devices 100 in a 1:N relationship may be disposed outside the service device 100 to be physically spaced apart from the service device 100.

The payment module 180 provides a function to pay for services provided by the plural service devices 100. For example, with the payment module 180 disposed in the store to provide the payment function, a user can pay for use of a service device selected by the user or specified by the payment module 180.

The payment unit 130 or the payment module 180 may provide various payment forms such as inserting cash, paying with credit, debit, or prepaid cards, and paying with e-money.

As described in the embodiment shown FIG. 3, the service device 100 may be connected to the installation management device 300 via the hub device 800 or the access point device 700.

In particular, the device controller 150 controls the communication unit 120 to communicate with the hub device 800 upon inputting a reset command into the service device or at the start of initial operation of the service device. As a result, the service device 100 can communicate smoothly even in the absence of or upon expiration of stored communication setup information necessary for connection to the access point device 700.

The communication unit 120 may receive device setup information or communication setup information from the installation management device via the hub device 800. Via links S21 to S22 of FIG. 3 or links S25 to S26 of FIG. 3, the installation management device 300 may modify, register, or delete the setup information on the service device 100. The device controller 150 stores the device setup information or the communication setup information in the storage unit 110.

The communication unit 120 receives control information from the server 500 and transmits status information to the server 500.

Figure 8:
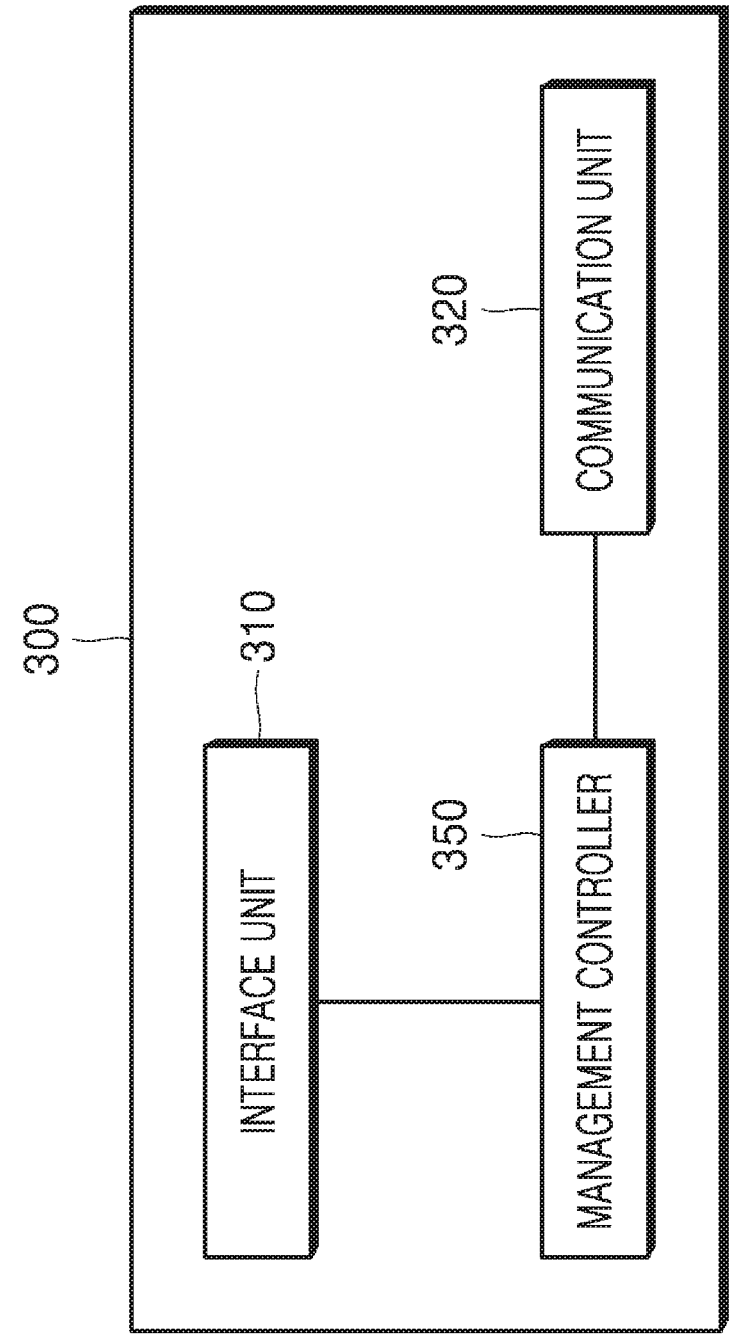
FIG. 8 shows a configuration of an installation management device according to one embodiment of the present invention.

FIG. 8 shows a configuration of an installation management device according to one embodiment of the present invention. The configuration shown in FIG. 8 may be equally applied to the operation management device. A management controller 350 of the installation management device 300 sets communication setup information or device setup information on the service device communicatively connected to the hub device or the access point device.

A communication unit 320 transmits the set information to each of the server 500 and the service device 100. The communication unit 320 may simultaneously or sequentially transmit the set information to the server 500 and the service device 100. Alternatively, the communication unit 320 may selectively transmit the set information to either the server 500 or the service device 100.

An interface unit 310 displays the communication setup information or the device setup information. When an operator selects a specific service device, the interface unit 310 may output detailed setup information on the corresponding service device.

In particular, a management controller 350 monitors communicative connectivity between the service device 100 and the access point device 700 and sets communication setup information for connection to the hub device 800 as the communication setup information on the service device depending upon monitoring results. As a result, even a service device 100 disposed in a radio-shadow area where reception of a communication signal is impossible can communicate via the hub device 800, thereby improving communication efficiency.

It will be understood that the installation management device 300 may register the service devices in the server 500 in the process of initial installation, as in the embodiment shown in FIG. 3.

In addition, the installation management device 300 may continuously check information on connection conditions of the service devices. Here, the information on connection conditions includes intensity of a communication signal between the service device and the access point device 700 or the hub device 800, and the number of times connection failure has occurred. Accordingly, the management controller 350 may compare information on communicative connectivity between the service devices and the hub device 800 with information on communicative connectivity between the service devices 100 and the access point device 700. Based on the comparison results, the management controller unit 350 may modify the communication setup information on the service devices 100.

When connectivity between the service device and the access point device 700 is poor, the installation management device 300 may modify the communication setup information on the service device 100 such that the service device may be connected to the hub device 800.

On the contrary, when too many service devices are connected to the hub device 800, the installation management device 300 may modify the communication setup information on service devices 100 having good connections to the access point device 700 such that the corresponding service devices may be connected to the access point device 700.

The communication unit 320 transmits the modified communication setup information to the service devices 100. This information is also transmitted to the server 500 such that the operation management device 400 or the installation management device 300 can ascertain a communicative connection method for each of the service devices 100.

Since account subscription is a function performed only by an authorized store operator, a customer code for authentication may be delivered to the installation management device 300 offline or online. Alternatively, an operator may perform account subscription through a pre-arranged private URL connection. In this way, the server 500 can prevent account subscription by any person other than an authorized operator.

In particular, the server 500 may previously store a serial number attached to the service device in the database 510 for convenience of an operator. When the operator transmits serial numbers of any one or more of plural service devices disposed in a store to the server 500 using the installation management device 300, the server 500 may identify identification information on the store based on the serial numbers and may provide the installation management device 300 of the operator with a link to guide account subscription.

That is, upon delivery from a warehouse, product codes attached to service devices 100 or serial numbers of individual products are matched with the identification information on a corresponding store. When the service devices 100 are installed in the store, an operator transmits the serial numbers of the service devices 100 to the server 500 using the installation management device 300.

Here, the installation management device 300 may transmit the serial numbers of at least two service devices to the server 500 to avoid mismatch between delivered service devices and the store. Then, the server 500 may generate a link for registration of an operator account based on the store identification information matching the serial numbers and transmit the link to the installation management device 300.

In this way, account registration can be carried out using information on actually installed service devices, thereby providing improvement in accuracy of account registration.

Figure 9:
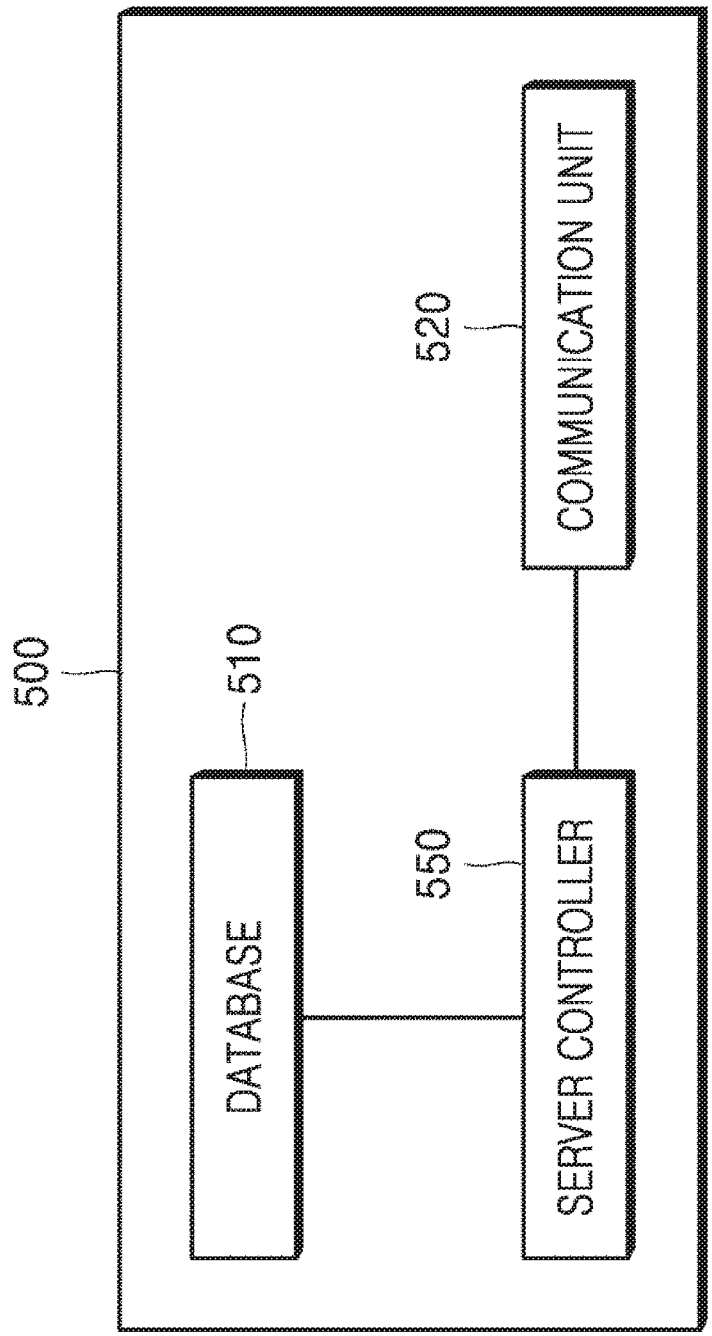
FIG. 9 shows a configuration of a server according to one embodiment of the present invention.

FIG. 9 shows a configuration of a server according to one embodiment of the present invention. A database 510 stores identification information on plural service devices 100, store identification information, operator account information, and the like.

A communication unit 520 communicates with various components. For example, the communication unit 520 communicates with the service device 100, the customer device 200, the installation management device 300, and the operation management device 400.

A server controller 550 controls the communication unit 520 and the database 510. In addition, the server controller 550 controls operation of the server 500, as in the embodiments of FIG. 1 to FIG. 6.

Figure 10:
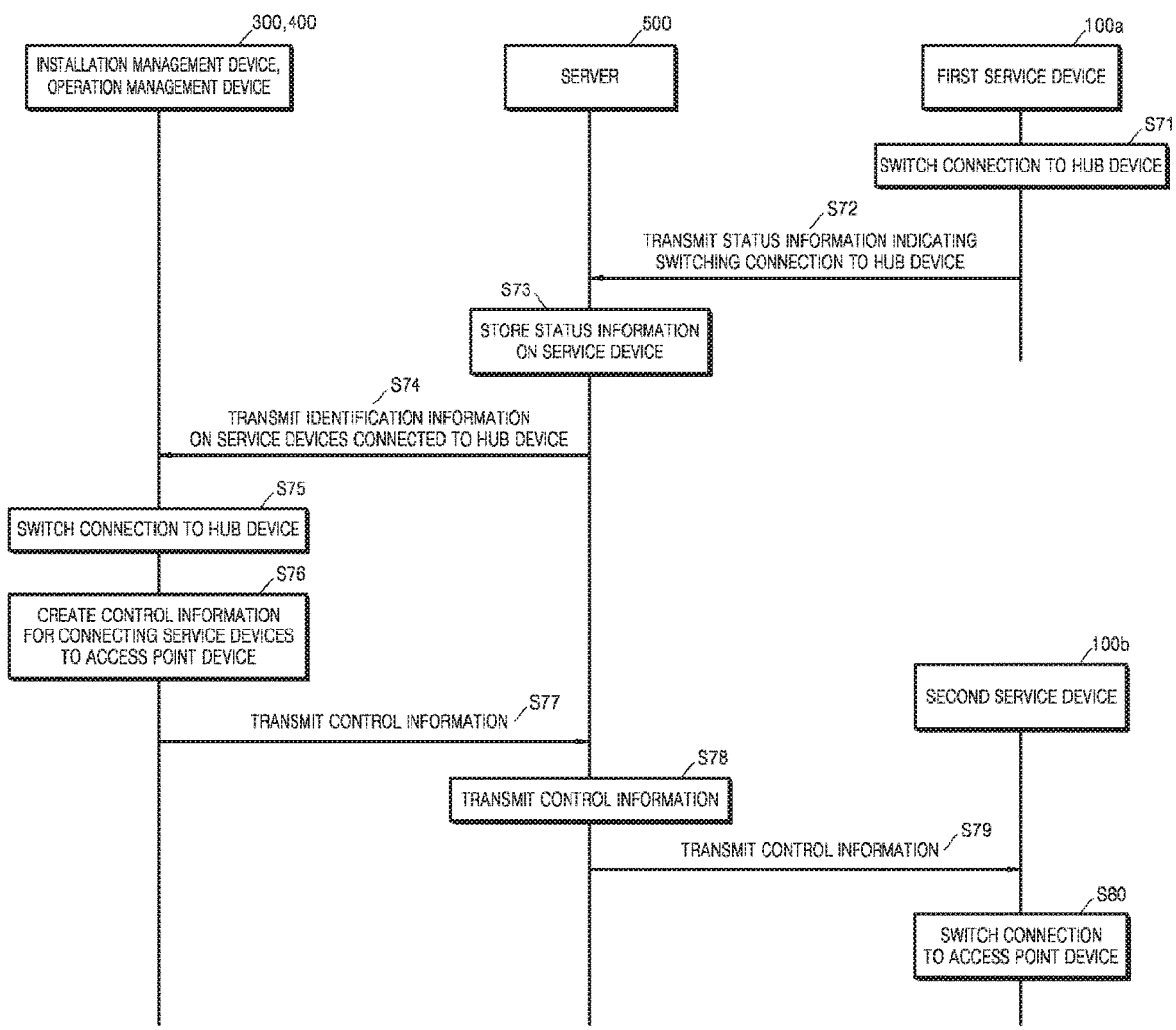
FIG. 10 illustrates a process in which a service device switches a connection to a service device according to one embodiment of the present invention.

FIG. 10 illustrates a process of switching a connection of a service device to a service device according to one embodiment of the present invention.

Connectivity between a first service device 100a and the access point device 700 is periodically checked. When the connectivity is poor, the first service device 100a is connected to the hub device 800. That is, when communicative connectivity to the access point device 700 is less than or equal to a predetermined reference value (signal intensity, error rate, communication speed, etc.), the device controller 150 controls the communication unit 120 to perform connection to the hub device 800.

As a result, the communication unit 120 switches connection of the first service device from the access point device to the hub device 800 (S71) and transmits status information to the server 500 (S72), wherein the status information indicates that the first service device has been connected to the hub device.

After receiving the status information indicating connection between the first service device and the hub device 800 from the first service device 100a in step S72, the server 500 stores the status information (S73).

Then, the server 500 transmits identification information on all service devices connected to the hub device 800 in a store to which the first service device 100a belongs to the installation management device 300 or the operation management device 400 (S74).

The installation management device 300 or the operation management device 400 outputs identification information on all of the service devices connected to the hub device 800 (S75). Upon ascertaining that too many service devices have been connected to the hub device 800, an operator generates control information to connect some of the service devices (for example, a second service device) to the access point device 700 (S76).

Then, the installation management device 300 or the operation management device 400 transmits the generated control information to the server 500 (S77).

The server 500 receives the control information for switching a communicative connection of at least one service device from the hub device 800 to the access point device 700 from the installation management device 300 or the operation management device 400 and stores the control information in the database 510 (S78).

Then, the server 500 transmits the control information to the second service device 100b (S79), which, in turn, switches a connection from the hub device 800 to the access point device 700 in response to the received control information (S80).

According to the embodiment shown in FIG. 10, when some of plural service devices in a store are unable to be connected to the access point device or have a bad connection to the access point device, the corresponding service devices switch connections from the access point device 700 to the hub device 800.

In addition, in order to prevent excessive increase in communicative connections to the hub device 800, the server 500, the installation management device 300, and the operation management device 400 can switch connections of some service devices from the hub device 800 to the access point device 700.

FIG. 11 shows a process in which a service device identifies a customer device making a reservation according to one embodiment of the present invention. In an embodiment shown in FIG. 11, the server 500 receives information for reservation of a specific service device 100 from the customer device 200 (S81). The server 500 transmits identification information on the customer device 200 requesting a reservation to the corresponding service device 100 (S82).

A user displays an identification number (a QR code, a PIN code, etc.) of their customer device 200 on a screen of the customer device 200 such that the interface unit of the service device 100 can read the identification number (S83). Alternatively, a user can directly input the identification number of their customer device 200 into the interface unit of the service device 100 (S83).

The device controller 150 of the service device 100 controls operation of the functional unit 190 by comparing the customer device identification information permitted for use by the server (received in step S82) with the identification information received by the interface unit 140 (input in step S83). As a result, a user making a reservation can use the service device 100.

Although all the elements constituting the embodiments of the present invention have been described as being combined into one or combined with one another to operate, it should be understood that the present invention is not limited thereto and at least one of the elements may be selectively combined with one another to operate. Further, all the elements may be implemented as respective independent hardware devices, but some or all of the elements may also be selectively combined and implemented in the form of a computer program having program modules which perform some or all of the functions combined by one or more hardware devices. Codes and code segments constituting the computer program may be easily conceived by those skilled in the art. Such a computer program is stored in computer readable storage media and is read and executed by the computer to implement the embodiments of the present invention. Examples of the storage media for storing the computer program may include magnetic recording media, optical recording media, semiconductor recording media, etc. In addition, the computer program for implementing the embodiments of the present invention includes a program module that is transmitted in real time via an external device.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A service device provided with a communication module, the service device comprising:
   a functional unit providing a function;
   a communication unit directly communicating with either a hub device or an access point device; and
   a device controller controlling the communication unit to perform connection to the hub device when communication setup information on the access point device is not stored in the service device or depending on communicative connectivity to the access point device;
   wherein the device controller controls the communication unit to communicate with the hub device upon inputting a reset command into the service device or at a start of initial operation of the service device, and the service device stores information necessary for access to the hub device; and
   the service device is connected to the hub device during collective registration.

2. The service device according to claim 1, wherein when the communication unit receives device setup information or the communication setup information from an installation management device via the hub device, the device controller stores the device setup information or the communication setup information.

3. The service device according to claim 1, wherein the communication unit receives control information for controlling a function from a server and transmits status information generated after provision of the function to the server.

4. The service device according to claim 1, wherein the device controller controls the communication unit to perform connection to the hub device when communicative connectivity to the access point device is less than or equal to a predetermined reference value, and the communication unit transmits status information indicating that the communication unit has been connected to the hub device to the server.

5. The service device according to claim 1, further comprising:
   an interface unit receiving identification information on a customer device,
   wherein the device controller controls operation of the functional unit by comparing customer device identification information permitted for use by the server with the identification information on the customer device received by the interface unit.

6. An installation management device for managing a service device provided with a communication module, the installation management device comprising:
   a management controller setting communication setup information or device setup information on the service device communicatively connected to a hub device or an access point device;
   a communication unit transmitting the setup information to a server and the service device; and
   an interface unit displaying the communication setup information or the device setup information,
   wherein the management controller monitors communicative connectivity between the service device and the access point device and sets communication setup information for connection to the hub device as the communication setup information on the service device;
   wherein the service device communicates with the hub device upon receiving a reset command or at a start of initial operation and the service device stores information necessary for access to the hub device; and
   the plurality of service devices are connected to the hub device during collective registration.

7. The installation management device according to claim 6, wherein the management controller modifies the communication setup information on the service device by comparing information on communicative connectivity between the service device and the hub device with information on communicative connectivity between the service device and the access point device, and the communication unit transmits the modified communication setup information to the service device.

8. A system for managing a service device provided with a communication module, the system comprising:
   a server receiving control information from an operation management device to transmit the control information to the service device and receiving status information on the service device from the service device to transmit the status information to the operation management device;
   the operation management device monitoring the service device to generate the control information; and
   a plurality of service devices receiving the control information from the server and transmitting the status information to the server;
   wherein the service device communicates with the hub device upon receiving a reset command or at a start of initial operation, and the service device stores information necessary for access to the hub device; and
   the plurality of service devices are connected to the hub device during collective registration.

9. The system according to claim 8, further comprising:
   an installation management device communicating with a hub device and transmitting device setup information on the service device to the server.

10. The system according to claim 8, wherein the operation management device receives a first type of status information transmitted from the service devices from the server, generates control information for controlling operation or communicative connection of the service devices, and transmits the control information to the server, and the server stores the control information in a database thereof, transmits the control information to the service devices, receives a second type of status information from the service devices, stores the second type of status information in the database, and transmits the second type of status information to the operation management device.

11. The system according to claim 8, wherein the server receives status information from a first service device, the status information indicating that the first service device has been connected to the hub device, stores the status information, transmits identification information on all of the service devices connected to the hub device to an installation management device or the operation management device, and receives control information from the installation management device or the operation management device, the control information being generated for switching a communicative connection of a second service device from the hub device to the access point device.

12. The system according to claim 8, wherein the server receives store identification information and a request for an alarm from a customer device, stores a condition of the alarm, receives information from a service device in a store corresponding to the store identification information, and transmits an alarm message to the customer device when the information satisfies the condition of the alarm.

13. The system according to claim 12, wherein the server receives location information on the customer device from the customer device and deletes the condition of the alarm when the customer device is located at a predetermined distance or more from the store.

* * * * *